July 13, 1937.   M. SCHLEICHER ET AL   2,086,990
APPARATUS FOR SUPERVISING A PLURALITY OF MOVABLE MEMBERS
Filed Sept. 26, 1930    2 Sheets-Sheet 1
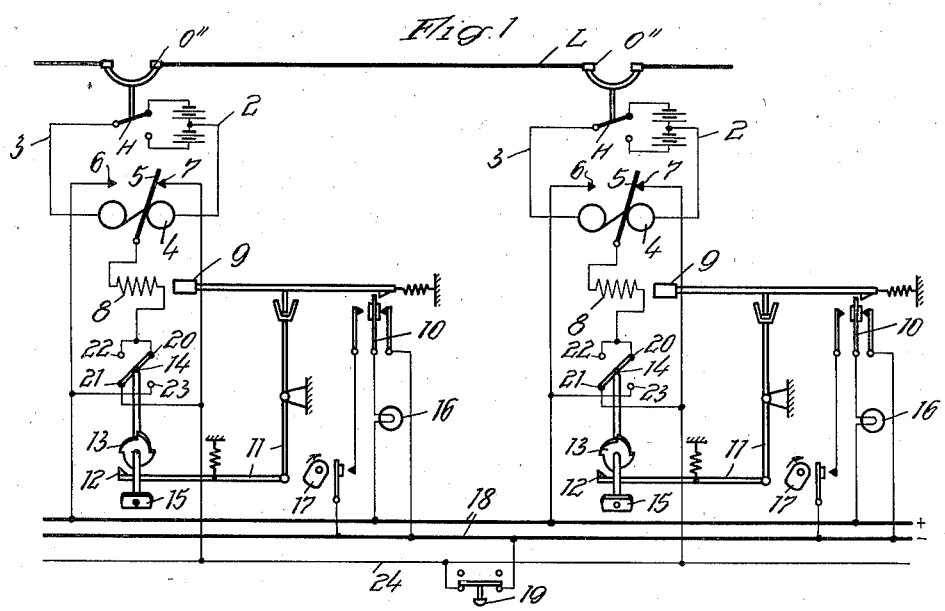
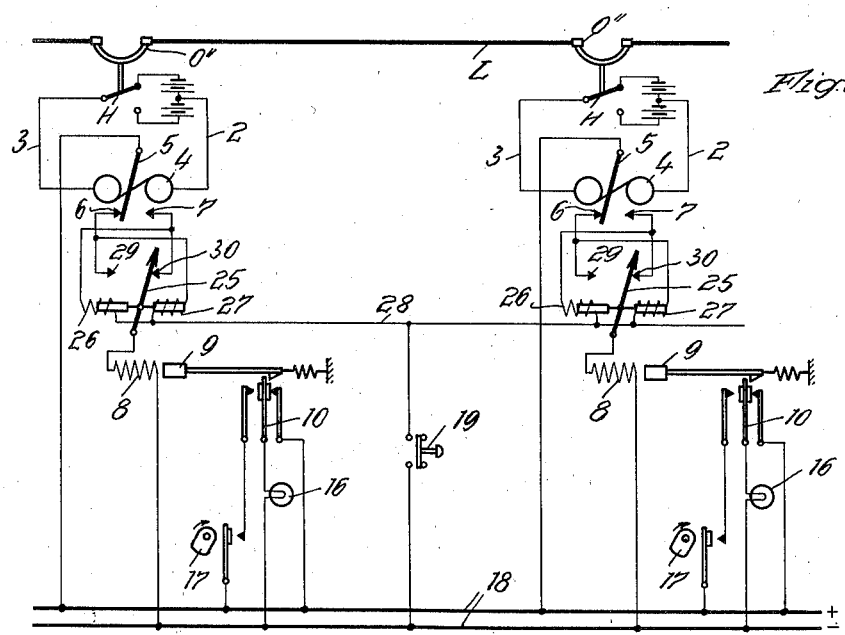
Inventors:
Manfred Schleicher
and Gotthold Kraft
by Lotka & Kehlenbeck
Attorneys

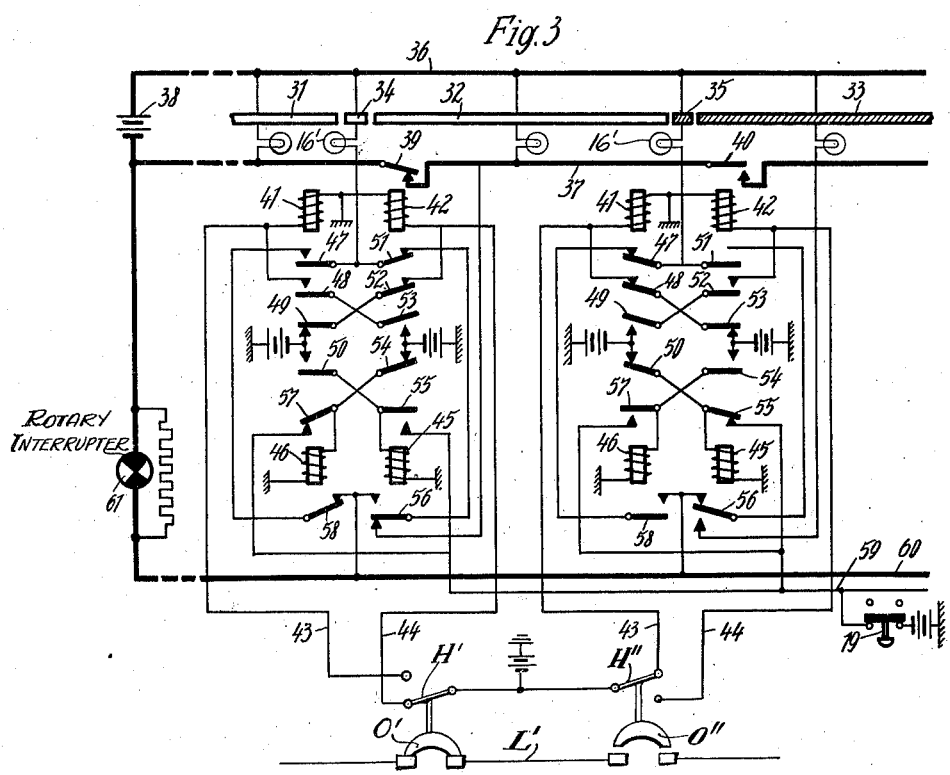

Patented July 13, 1937

2,086,990

UNITED STATES PATENT OFFICE 2,086,990

APPARATUS FOR SUPERVISING A PLURALITY OF MOVABLE MEMBERS

Manfred Schleicher and Gotthold Kraft, Berlin-Charlottenburg, Germany, assignors to Siemens-Schuckertwerke Aktiengesellschaft, Berlin-Siemensstadt, Germany, a corporation of Germany Application September 26, 1930, Serial No. 484,577
In Germany October 2, 1929

9 Claims. (Cl. 177—311)

Our invention relates to apparatus for supervising a plurality of movable members.

Remote control plants are already known in which a change in the position of the members to be controlled renders an alarm signal operative which continues in operation until a switch coordinated to the respective member is thrown by the attendant who thus signals back that he has noted the change of position. The positions at any time of the movable members may in well-known manner be indicated by signal lamps of different colors which are switched on or off indirectly or directly in dependence on the position of the respective members. It has also already been suggested to couple these signal stopping switches with a position indicator or to design the switches themselves as position indicators so that in the event of a change of position the alarm signal is stopped by throwing over the position indicator. As nowadays it is usually necessary to supervise a considerable number of members the switch desks or boards occupy a large space, particularly if command transmitting gear is also provided upon them. The attendant is from his station well able to overlook the position or changes of position of the individual members, but is continuously obliged to change his place in order to enable him to operate the signal stopping switches or the position indicators, which is liable to lead to undesirable delays, particularly during periods of increased switching activity.

The object of our invention is to eliminate this drawback by providing a manually operated member by means of which all the signal stopping switches connected to the signals to be operated can be operated simultaneously. The arrangement may be such that the position indicating devices provided for the individual adjustable members are controlled from the signal stopping switches or that these switches themselves are designed as position indicators. The signal stopping switches may also be singly operated by hand.

In the drawings various embodiments of our invention are illustrated by way of example.
In the drawings Fig. 1 is a diagram of one embodiment of our invention, Fig. 2, a diagram of a modification of Fig. 1, and Fig. 3, a diagram of a plant which is supervised by an illuminated dummy switch scheme.

Referring to Fig. 1 of the drawings it will be observed that for the sake of simplicity the necessary supervisory equipment is shown only for a single movable member. In dependence on the position of the movable member, for instance an oil switch O or the like in the line L, a polarized relay 4 is energized in one direction or the other across the wires 2, 3, as by means of an auxiliary switch H operatively connected with said line switch O, in the manner indicated in Fig. 2. The contact reed 5 of the polarized relay 4 plays between two contacts 6 and 7 and thus always takes up a position corresponding with the position of the member O connected with it. 8 is a relay which by means of an armature 9 controls a change-over switch 10 and also, through a system of hinged rods 11, a pawl 12 and a ratchet wheel 13, controls the signal stopping switch 14.

This switch is also adapted to be operated by means of a handle 15 so designed as to be able to act at the same time as position indicator for indicating the position of the respective adjustable member. The handle 15 may, for instance, be located within an illuminated dummy switch scheme and is then illuminated from a signal lamp 16 which is connected to a supply of current 18 either directly or through a contact breaker 17. 19 is a push button switch common to all the movable members. The contact reed 5 and the signal stopping switch 14 are so connected in circuit that when their positions correspond, the relay 8 becomes deenergized. If one of the two switches 5 and 14 is thrown over, the relay 8 is energized; it thus drops only when the other switch is thrown over as well.

The mode of operation of the system is as follows: if the movable member O changes its position automatically or due to an order received from the control station, the polarized relay 4 is energized so that the contact reed 5 touches the contact 6. This completes a circuit for the signal relay 8 from the positive pole of the source of current 18 through the contact 6, the contact reed 5, the winding of the relay 8, the contacts 20 and 21 of the switch 14, the line 24, the usually closed contacts of the push-button switch 19 to the negative pole of the source of current 18.

The relay 8 being energized, attracts its armature 9 and operates the change-over switch 10, so that the signal lamp 16 is connected to the supply through the contact breaker 17 and commences to flicker as a signal that the position of the corresponding movable member has changed. When the relay 8 is energized, the pawl 12 is by the system of pivoted links 11 drawn back to such an extent that it comes into engagement with the ratchet wheel 13 of the signal (flickering of the lamp 16) stopping switch 14. The alarm signal calls the attention of the attendant to the change of position of the respective movable member and forces him also to bring the respective position indicator, by stopping the flicker signal, into the position corresponding with the fresh position of the member. He may effect this by hand by operating the signal stopping switch 14 by means of the handle 15 so that the contacts 22 and 23 are connected with one another. The circuit of the relay 8 is then broken, the armature 9 of the relay drops and the lamp ceases to flicker. He may, however, also effect this by operating the pushbutton switch 19. The circuit of the signal relay 8 is then broken, its armature drops, and the switch 14 is turned through an angle of 90° into the position corresponding with the fresh position of the movable member, by means of the system of hinged links 11, the pawl 12 and the ratchet wheel 13. In this way the circuit of the relay 8 is broken, as described above.

The push button switch 19 is thus able to return into its inoperative position without the alarm signal being operated again. As soon as the adjustable member is displaced again, the contact reed 5 is placed against the contact 7 and the processes described are repeated again. The supervisory gear of the remaining movable members is similar to the one illustrated and is connected in the same manner, the contacts 7 and 21 of all the movable members being connected to the line 24. The excitor circuits of all the signal relays 8 thus pass across the push button switch 19. All the signal stopping switches 14 may thus be operated by means of the push button switch 19. If a number of movable members change their position and a plurality of alarm signals are consequently operated, the signal stopping switches coordinated to these members are simultaneously moved, by the operation of the push button switch 19, into the position corresponding with the fresh positions of the movable members.

Referring to Fig. 2 of the drawings, 25 indicates the signal stopping switch which is controlled by two electromagnets 26, 27. One end of the winding 26 is connected to the contact 7 of the polarized relay 4, the corresponding end of the winding 27 to the contact 6. The other two ends of the windings are connected to the line 28 which is adapted to be connected to the negative pole of the source of current 18 by means of the push button switch 19. The signal stopping switch 25 plays between the two contacts 29 and 30. It may also be provided with further contacts, not shown, to which are connected, for instance, red and green signal lamps for indicating the position of the respective movable member. It may, however, also be provided with a handle similar to the handle 15 of the signal stopping switch 14 in Fig. 1, which may serve as position indicator.

In the position shown in the drawings the signal relay 8 is deenergized. The position of the signal stopping switch 25 thus corresponds with the position of the contact reed 5 and thus with the position of the respective movable member O. If this member is displaced, the contact reed 5 touches the contact 7 whereby the circuit of the signal relay 8 is completed passing from the positive pole of the source of current 18 over the contact reed 5, the contact 7, the contact 30, the signal stopping switch 25 and the winding of the relay 8 to the negative pole. The relay 8 attracts its armature 9 and operates the changeover switch 10 so that the signal lamps 16, which up to that time were burning steadily, start flickering. In order to stop the flickering and at the same time to change the position indicating device in correspondence with the fresh position of the movable member, or if the signal stopping switch is designed as a position indicator, to bring it into the correct position, the attendant may momentarily close the push button switch 19. This completes a circuit for the electromagnet 26, from the positive pole of the source of current 18 across the contact reed 5, the contact 7, the winding 26, the line 28 and across the contacts of the push button switch 19 to the negative pole. The electromagnet 26 is energized and the signal stopping switch 25 is reversed so that it touches the contact 29. This breaks the circuit of the signal relay 8 and thus stops the alarm signal. The other movable members not shown in the drawing or their supervisory adjuncts are wired in the same way, i. e. one end of each of the two windings 26 and 27 of all the signal stopping switches 25 is connected to the line 28. When operating the push button switch 19, only those signal stopping switches will be operated in each case, the respective members of which have been displaced and the alarm signals of which have consequently been operated, as will be readily understood from the diagram of connections.

Fig. 3 shows the invention applied to a plant which is supervised by an illuminated dummy switch scheme. In this scheme the connections of the plant at any time are indicated by illuminating or keeping dark the symbols in the dummy scheme representing the various switches, lines and so on. The position of the switches to be supervised may in the dummy schemes be indicated by a preferably illuminated strip located in the direction of the section of the line when the switch is closed and across the section when the switch is open. The handle 15 in Fig. 1 may, for instance, be used for this purpose. The arrangement may, however, also be such that the strip is permanently located in the direction of the section of the line and is illuminated only when the switch is closed. If the strip is dark this indicates that the switch is open. This type of representation is illustrated in Fig. 3.

31, 32 and 33 are the symbols for a number of line sections between which are located the switch symbols 34 and 35 analogous to the actual diagram of connections. The lamps illuminating the line sections are connected to a source of current 38 by the lines 36 and 37. In the line 37 are connected the switches 39 and 40 which in dependence on the position of the switches O' and O'' respectively appertaining to them connect the individual sections of the line 37 with one another so that the symbols in the dummy scheme corresponding with the live sections of the line are illuminated while the symbols in the scheme representing the dead sections remain dark. In the example illustrated there are shown the supervisory equipments for two switches represented by the symbols 34 and 35. Each switch is connected to two relays 41 and 42. These relays are controlled in dependence on the position of the respective switch O' or O'' in the line L' and their auxiliary switches H' and H'' respectively by the lines 43 and 44 in such a manner that if the switch O' or O'' is open, the relay 41 is energized, and if the switch is closed, the relay 42 is energized. By each of these two relays 41 and 42 is controlled a relay 45, 46. The contacts 56 and 58 controlled by them correspond to the signal stopping switch 14 or 25 shown in the Figs. 1 and 2 respectively. 19 is again a push button switch common to all switches; by the actuation of this push button all the alarm signals in operation are stopped simultaneously.

The mode of operation of this system is as follows: In the position shown the switch O' corresponding with the switch symbol 34 is closed and consequently the corresponding relay 42 is energized.

The switch 39 controlled by such relay 42 is therefore closed so that the line section symbols 31 and 32 as well as the switch symbol 34 are illuminated. The switch O'' corresponding with the switch symbol 35 is open so that the corresponding relay 41 is energized, the relay 42 deenergized, the switch 40 open and thus the switch symbol 35 and the line section symbol 33 as well as all the connected line section symbols, not shown, are dark. If now the switch O'' corresponding with the switch symbol 35 is closed, the relay 42 responds. The switch 40 is closed thereby and the line section symbol 33 is illuminated. When the relay 42 is energized the armatures 51 to 54 are also attracted. At the armature 53 the relay 42 opens the holding circuit of the relay 41 so that this relay allows its armatures 47 to 50 to drop. At the armature 52 the relay 42 closes a holding circuit for itself across the armature 49 and its rest contact. At the armature 54 it closes a circuit for the relay 46 which at its armature 57 closes a holding circuit for itself through the line 59 and the normally closed contacts of the push button switch 19. When the relay 41 is deenergized and the original energizing circuit for the relay 45 is interrupted at the armature 50, the relay 45 remains energized by its holding circuit likewise passing over the line 59 and the push button switch 19. When the relay 42 is energized it also connects at the armature 51 the lamp of the switch symbol 35 in a circuit passing across the armatures 51 and 56 as well as their working contacts, the busbar 60 and the contact breaker 61 to the battery 38.

The signal lamp illuminating the switch symbol 35 which up to that time was switched off thus flickers, and calls the attention of the attendant to the fact that the respective switch has been operated. By actuating the push button switch 19 the alarm signal may be stopped by breaking the holding circuit of the relay 45. The armature 56 of this relay drops off and disconnects the signal lamp illuminating the switch symbol 35 from the flicker busbar 60 and connects it to the line 37 so that the switch symbol 35 now receives steady light.

If now, for instance, the switch O' corresponding with the switch symbol 34 opens automatically, the relay 41 controlled by it is energized. It opens the holding circuit of the relay 42 so that its armatures drop off and the sections of the line 37 controlled by the switch 39 become dead. The relay 41 also closes a holding circuit and furthermore a circuit for the relay 45. The relay 46 remains energized when the relay 42 drops open. The lamp illuminating the switch symbol 34 is therefore connected in a circuit across the armature 47 and its operating contact, the busbar 60 and the contact breaker 61 to the battery 38. Its flickering can be stopped by operating the push button switch 19 because the holding circuit of the relay 46 is opened by said switch. The original exciting circuit is previously broken at the armature 54 of the relay 42.

The relays 41, 42, 45 and 46 coordinated to the remaining switches or supervising devices, not shown in the drawings, are connected in the same way as those shown in the drawings, i. e. the holding circuits of the relays 45 and 46 are all passed across the line 59 and the push button switch 19.

As will be readily gathered from the preceding description, the individual line section symbols in the illuminated wiring diagram are correspondingly changed over immediately on arrival of the back signal. The switches 39 and 40 and so on connected in the line 37 are shown as dependent upon the relays 42. The arrangement may, however, be such that the illuminated dummy wiring diagram is changed over only when the push button switch 19 is actuated for the purpose of stopping the alarm signal. It is then only necessary to allow the switches 39 and 40 to be controlled by the relays 45, in such a manner that they are closed only when the relays 45 have dropped open.

In the examples represented in the Figs. 1 and 2 alarm signals coordinated to the various switches may also be operated by hand. This provision may also be made in Fig. 3 by providing for each of the switches a special push button switch, similar to the switch 19, in the lines for the holding circuits of the relays 45, 46 connected to the line 59.

In plants supervised by illuminated dummy switch schemes or illuminated model wiring diagrams these dummy schemes or model diagrams are frequently switched off during the night or slack times. The switch symbols are then preferably connected in a special circuit which remains permanently alive so that breakdowns are indicated by the flickering of the switch symbols even when the diagram is dark.

Instead of providing a single push button switch 19 for all the switches to be supervised, the individual switches may be combined into banks or groups, for instance according to the various substations to be supervised, a special push button switch being provided for each of these banks or groups.

We claim as our invention:—

1. A supervising system comprising a plurality of members movable from one position to another position, a plurality of elements, one for each movable member, means for moving said elements in response to a change of position of the corresponding movable members so that each element always has a position corresponding to that of its movable member, a plurality of indicating devices one for each of said elements and movable members to indicate the position of said elements and members, a plurality of signals one for each of said elements for calling attention to each indicator which is not in a position corresponding to its respective element, switches one for each of the several signals and the corresponding indicating devices, means for separately operating each of said signals whenever the position of the respective indicating device does not correspond to the position of the respective element, means for operating said switches, a manually operated member common to all of said switches, electrical circuits including said manually operated member and said switches, and connections between said circuits and the switch operating means of those units in which the position of the indicating device indicates a change of position of the element for operating said switch operating means upon operation of said manually operated member to correct the indications of those indicators which are incorrect and to stop the respective signal or signals.

2. A system according to claim 1, in which the signal-operating means consist of relays each coordinated to one of the movable members, and associated with means for energizing said relays in response to a change in the position of the respective movable members, to cause the operation of the respective signals, and in which said relays upon being deenergized will effect a change in the position of the respective switches.

3. A system according to claim 1, in which the signal-operating means consist of relays each coordinated to one of the movable members, and in which there is associated with each of said relays, a plurality of relay-energizing circuits each including the corresponding switch and said manually operated member, each of said circuits being closed in response to a change in the position of the respective movable member, and being adapted to be opened by the actuation of said manually operated member.

4. A supervising system comprising a plurality of members movable from one position to another position, a plurality of elements, one for each movable member, means for moving said elements in response to a change of position of the corresponding movable members so that each element always has a position corresponding to that of its movable member, a plurality of signals one for each of said elements to indicate a change in the position of said elements, a plurality of indicating devices one for each of said elements and movable members to indicate the position of said elements and members, switches one for each of the several signals and the corresponding indicating devices for actuating said signals and indicating devices, means for separately operating each of said signals whenever the condition of the respective indicating device does not correspond to the position of its respective element, means for operating said switches, a common manually operated member electrically connected to said switch operating means, actuation of said common member causing each of those indicating devices in incorrect position to assume a correct position and also cutting off the signal.

5. A supervising system comprising a plurality of members movable from one position to another position, a plurality of elements, one for each movable member, means for moving said elements in response to a change of position of the corresponding members so that each element always has a position corresponding to that of its movable member, a plurality of electrical circuits, a signal light in each of said circuits one for each of said elements to indicate a change in the position of said elements, means to break the circuits to cause said lights to flicker when the position of the respective element is changed, a plurality of indicating devices one for each of said elements and movable members to indicate the position of said elements and movable members, switches one for each of the several signals and the corresponding indicating devices, means for separately operating each of said signals whenever the condition of the corresponding indicating device does not correspond to the position of its respective element, means for operating said switches, and a common manually operated member electrically connected to said switch operating means, actuation of said common member causing each of those indicating devices in incorrect position to assume a correct position and also cutting off the flickering signal.

6. A supervising system comprising a plurality of units each comprising a member movable from one position to another, a plurality of elements, one for each movable member, means for moving said elements in response to a change of position of the corresponding movable members so that each element always has a position corresponding to that of its movable member, a switch element, an indicating device associated with the switch element and actuated thereby, an electric circuit including said switch element, said circuit being closed when the position of the switch and indicating device disagrees with that of the movable member and element, a signal, means energized by a closing of the circuit for operating the signal whereby the signal indicates a change of position of the movable member and element, means for moving said switch and for rendering said signal actuating means inoperative, a manually movable breaker, and means connecting said breaker to the circuit of each unit when said breaker is operated for causing a de-energizing of said signal actuating means which are then energized and for moving the corresponding switches to positions corresponding to the position of the respective elements and movable members.

7. A supervising system comprising a plurality of units each comprising a member movable from one position to another, a plurality of elements, one for each movable member, means for moving said elements in response to a change of position of the corresponding movable members so that each element always has a position corresponding to that of its movable member, a switch element, an indicating device associated with the switch element and movable therewith, an electric circuit including said switch element, said circuit being closed when the position of the switch and indicating device disagrees with that of the movable member and element, a signal, means actuated by a closing of the circuit for operating the signal, whereby the signal indicates a change of position of the movable member and element, an auxiliary circuit connected to said first circuit, a manually operable breaker, means connecting said breaker with the auxiliary circuit of each of the units, the auxiliary circuit of each unit being closed only when the position of the movable member and elements and the switch of that unit disagree in position and when the breaker is in closed position, means associated with each auxiliary circuit for actuating the switch of such unit when the auxiliary circuit is closed, whereby movement of the breaker to closing position will actuate the switches of those units in which the signal has been operated to a position corresponding to the position of the respective movable member and element.

8. A supervising system comprising a plurality of units each comprising an element movable from one position to another, a member, means for moving said member in response to a change of position of said movable element to a corresponding position, a switch member and an indicating device movable therewith for indicating the position of said movable element, an electric circuit including said member and said switch member, movement of said member to a non-corresponding position with said switch and indicating device closing said circuit, means energized by said circuit when closed for giving a signal, means for actuating said switch to a position corresponding to the position of said movable member and for de-energizing said signal giving means, and a manually operable member common to all movable elements of all the units, and electrical connections joining said manually movable member when operated to the switch actuating means of the units in which the position of the movable element has been changed, for moving said switch members to positions corresponding to the positions of their respectively associated movable elements.

9. A supervising system comprising a plurality of elements movable from one contact to another, a plurality of signals one for each movable element for indicating a change in position of such element, a plurality of indicating devices one for each movable element for indicating the position of such element, switches one for each movable element with a switch arm movable from one to the other of two contacts in correspondence with a change in the position of the corresponding movable element, each of said indicating devices being for a respective switch and operatively connected with the switch arm thereof, an electric actuating circuit for each movable element, said circuit comprising a source of electric energy, means for connecting one terminal of said source to each of said movable elements, means for connecting one of the two contacts for each movable element to one of the two contacts for each switch arm, and means for connecting each switch arm to the other terminal of the source, a circuit for each signal, means in said actuating circuits to be energized when the same are closed by movement of the movable element therein to a non-corresponding position with the corresponding switch and associated indicating device for closing the corresponding signal circuit, an auxiliary circuit for each movable element said circuits including means for actuating said switches and indicating devices, and a manually operated member common to all movable elements for closing the auxiliary circuits associated with the signals which have been actuated to move the associated switches and indicating devices to a position corresponding to the position of the corresponding movable element and to shut off the signal therefor.

MANFRED SCHLEICHER.
GOTTHOLD KRAFT.